United States Patent
Greifeneder et al.

(10) Patent No.: US 8,151,277 B2
(45) Date of Patent: Apr. 3, 2012

(54) METHOD AND SYSTEM FOR DYNAMIC REMOTE INJECTION OF IN-PROCESS AGENTS INTO VIRTUAL MACHINE BASED APPLICATIONS

(75) Inventors: Bernd Greifeneder, Linz (AT); Christian Schwarzbauer, Linz (AT); Helmut L. Hackl, Wilhering (AT)

(73) Assignee: dynaTrace software GmbH (AT)

( * ) Notice: Subject to any disclaimer, the term of this patent is extended or adjusted under 35 U.S.C. 154(b) by 994 days.

(21) Appl. No.: 12/120,495

(22) Filed: May 14, 2008

(65) Prior Publication Data

US 2008/0288962 A1 Nov. 20, 2008

Related U.S. Application Data

(60) Provisional application No. 60/917,951, filed on May 15, 2007.

(51) Int. Cl.
*G06F 9/44* (2006.01)
*G06F 15/177* (2006.01)
(52) U.S. Cl. ............ 719/317; 717/158; 717/130; 718/1; 713/2
(58) Field of Classification Search ........................ None
See application file for complete search history.

(56) References Cited

U.S. PATENT DOCUMENTS

| | | | |
|---|---|---|---|
| 7,293,260 B1 * | 11/2007 | Dmitriev | 717/130 |
| 7,818,721 B2 * | 10/2010 | Sundararajan et al. | 717/130 |
| 7,957,934 B2 * | 6/2011 | Greifeneder | 702/182 |
| 2006/0271930 A1 * | 11/2006 | Letizi et al. | 718/1 |
| 2007/0169055 A1 * | 7/2007 | Greifeneder | 717/158 |
| 2007/0180439 A1 * | 8/2007 | Sundararajan et al. | 717/158 |

* cited by examiner

*Primary Examiner* — H. S. Sough
*Assistant Examiner* — Umut Onat
(74) *Attorney, Agent, or Firm* — Robert Plotkin, P.C.

(57) ABSTRACT

A method and system for dynamic and adaptive deployment of in-process agents to virtual machine based applications which may run on remote hosts is provided. A bootstrap agent is injected into the application, using standardized interfaces provided by virtual machine based systems like SUN MICROSYSTEMS' JAVA system or MICROSOFT's .NET system. The bootstrap agent establishes a network connection to a management server which provides binaries representing in-process agents in bytecode or native code format. The bootstrap agent sends data identifying its runtime environment to the management server, which determines the matching in-process agent binaries for the runtime environment of the connected agent and sends the selected binaries to the bootstrap agent. The bootstrap agent receives the binaries and installs them to its hosting virtual machine, according to their format (bytecode or native code).

32 Claims, 6 Drawing Sheets

Deploy In-Process Agent Binaries

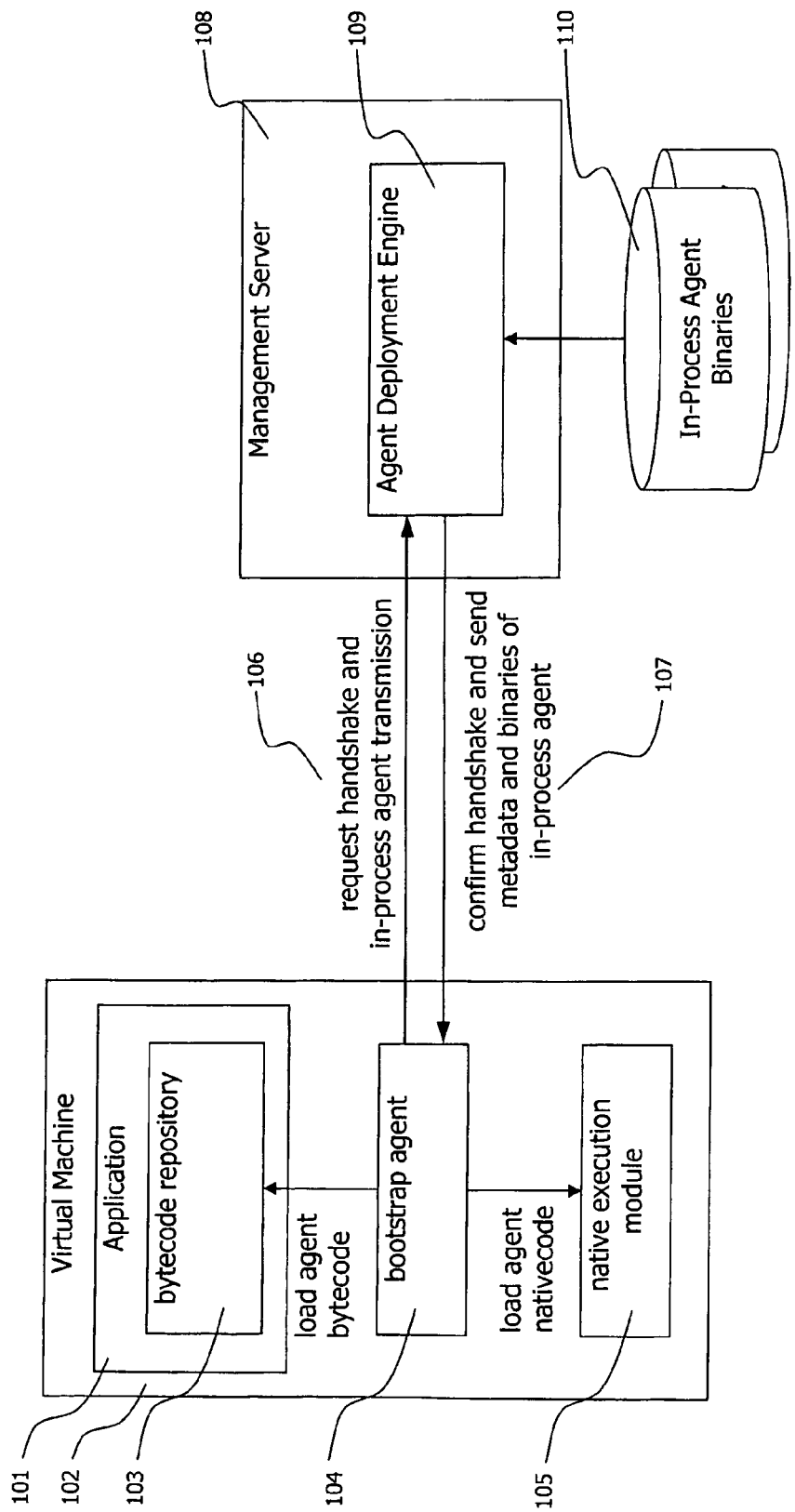
FIG 1: Agent Injection Process

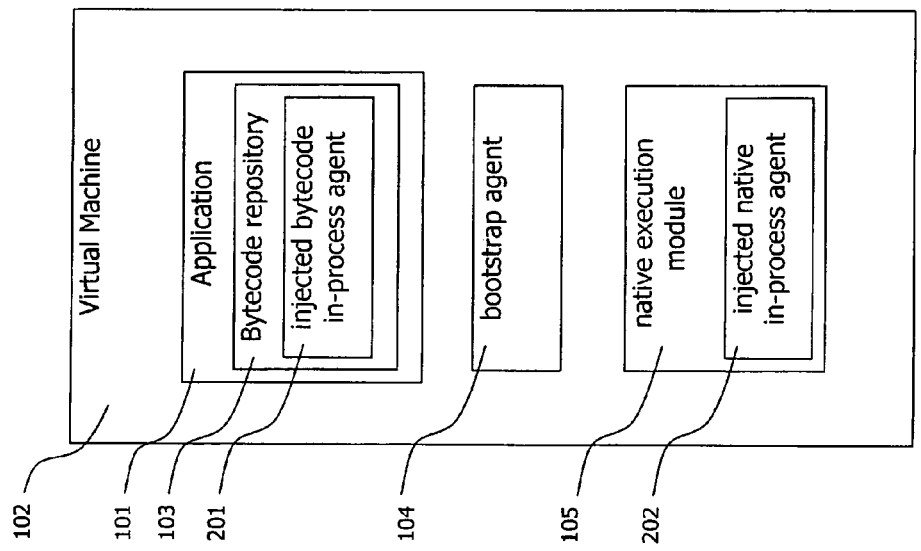
FIG 2: Injected Agents

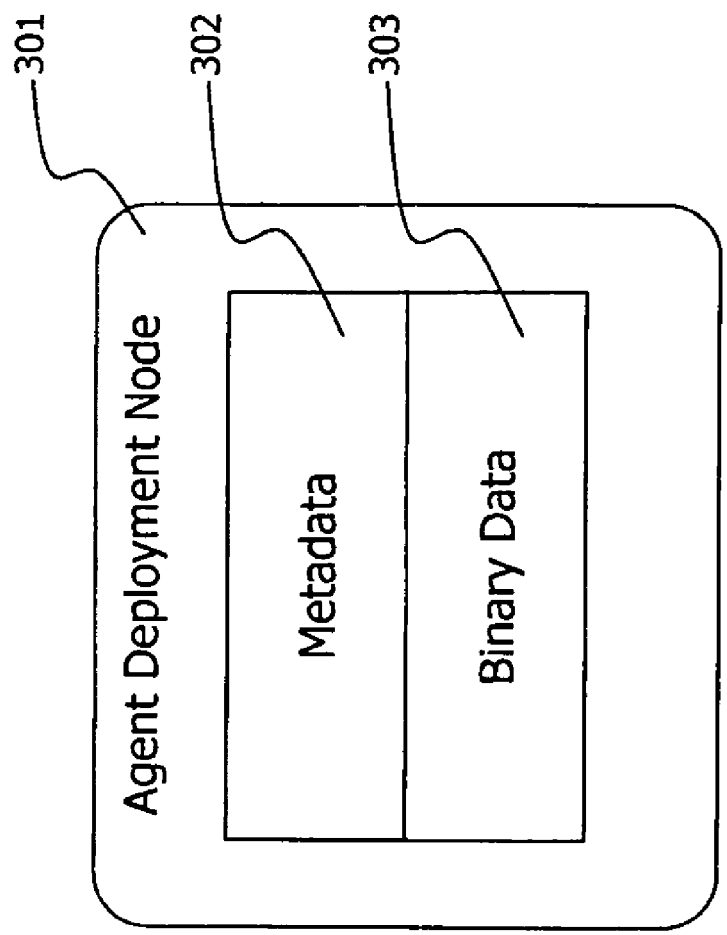
FIG 3: Agent Deployment Node

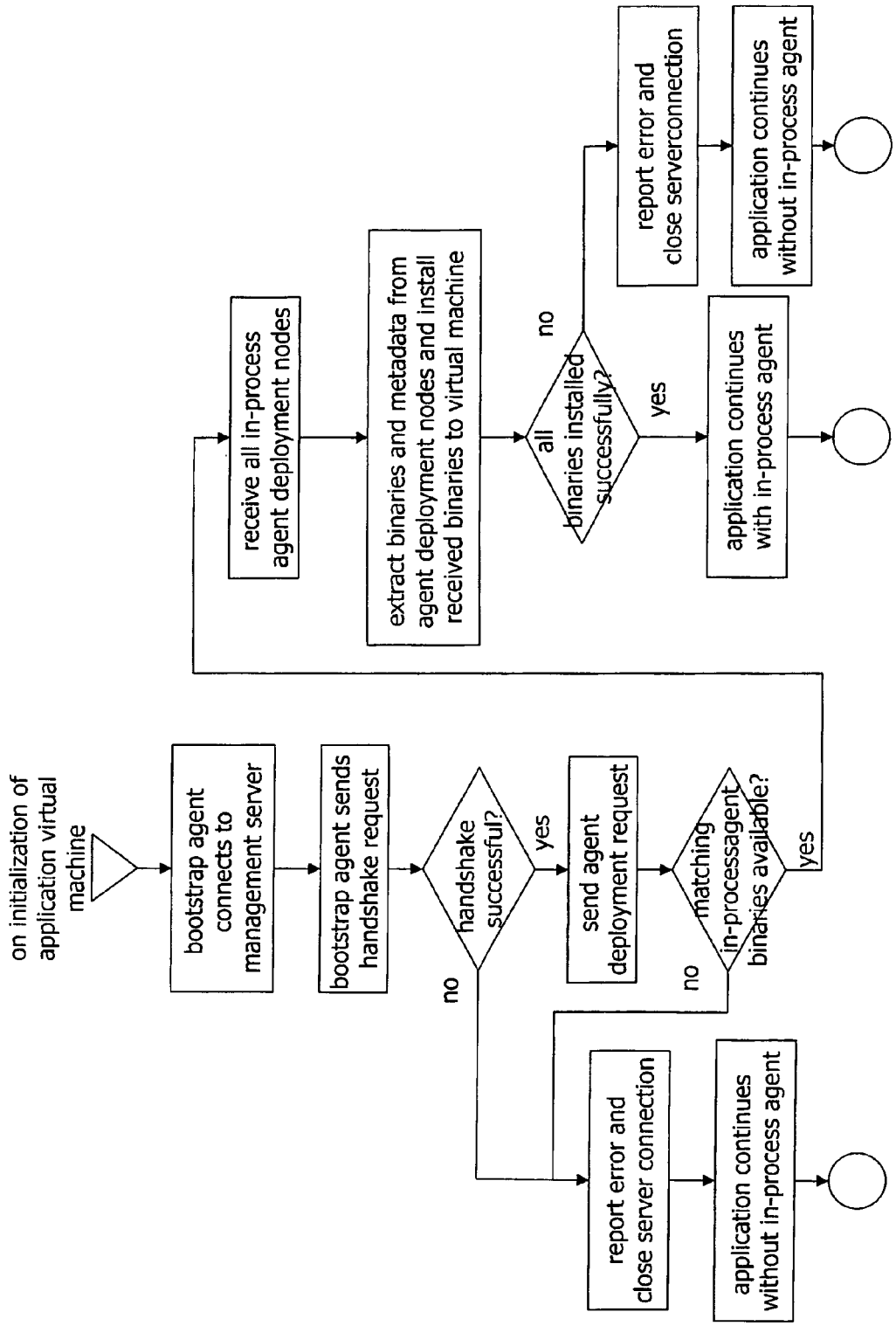

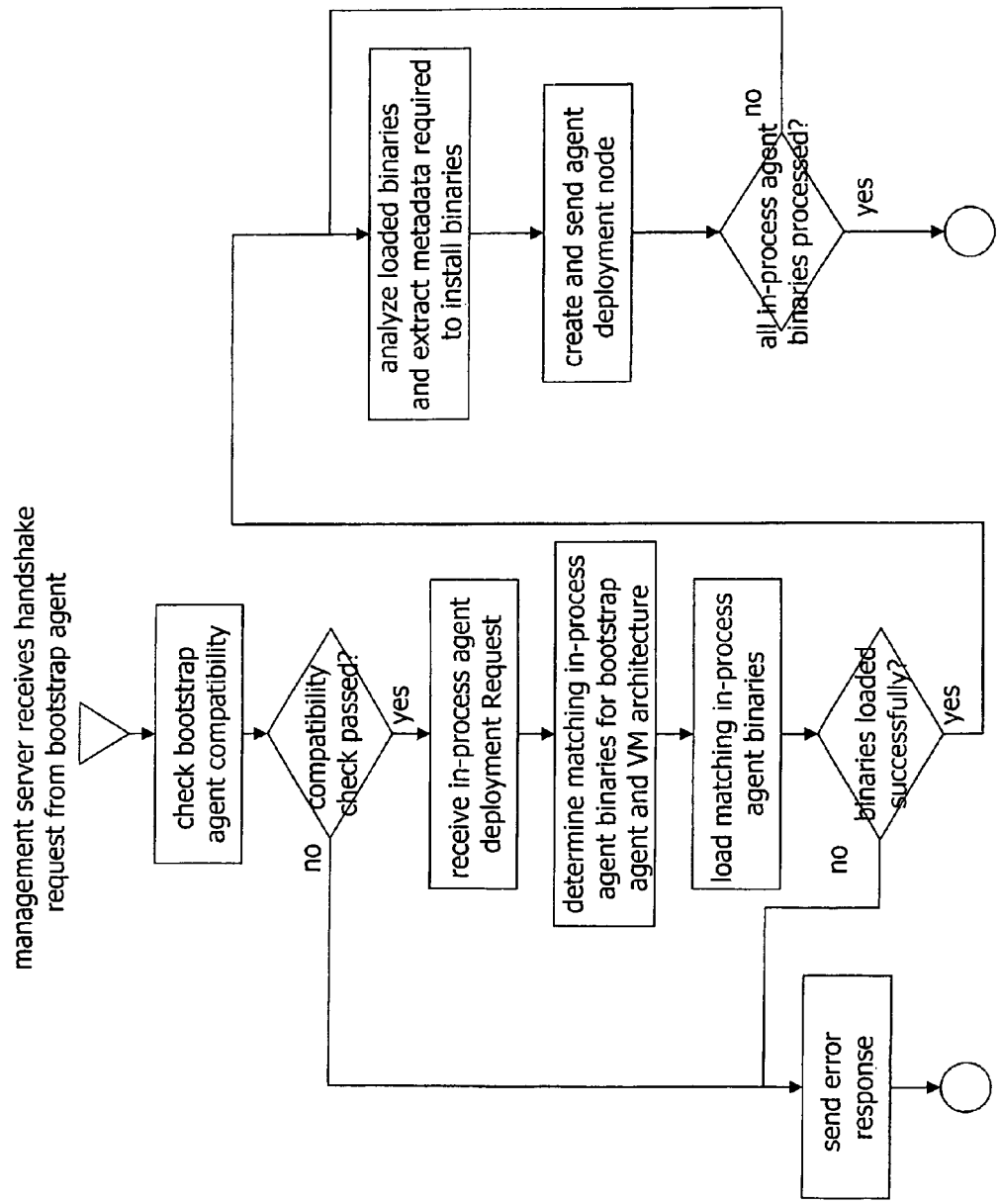
FIG 5: Send In-Process Agent Binaries

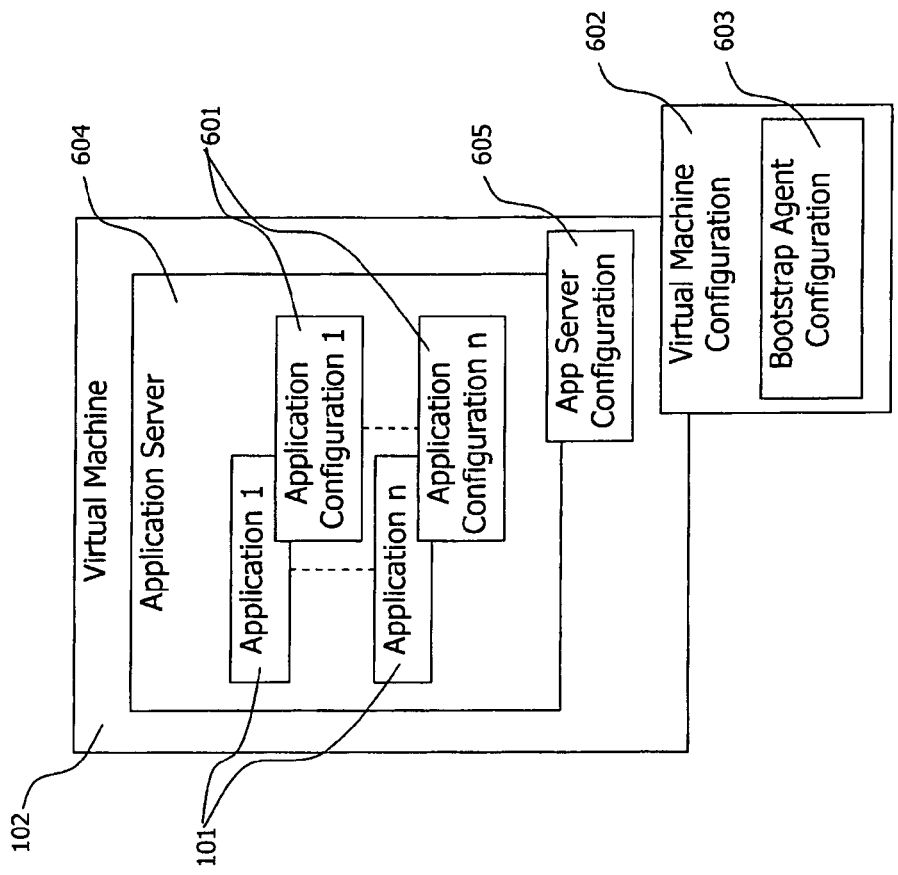
FIG 6b: Configuration of Bootstrap Agent in Application Server Setup
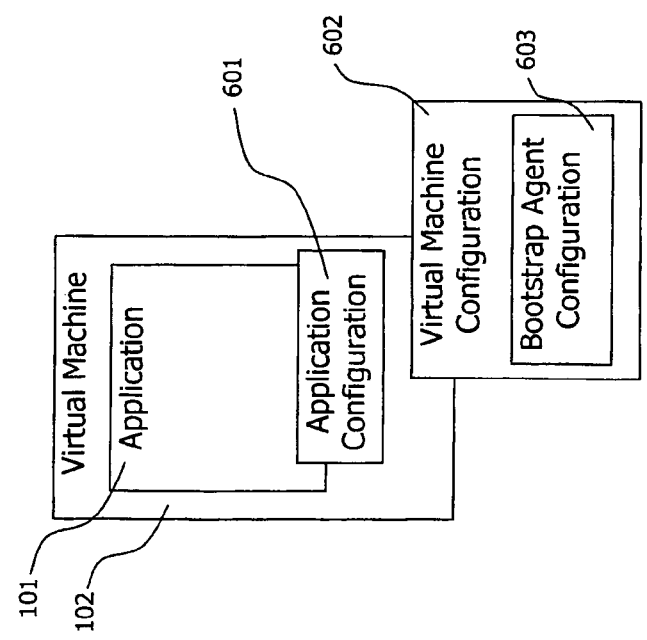
FIG 6a: Configuration of Bootstrap Agent

METHOD AND SYSTEM FOR DYNAMIC REMOTE INJECTION OF IN-PROCESS AGENTS INTO VIRTUAL MACHINE BASED APPLICATIONS

PRIORITY

The present invention claims priority under 35 USC section 119 and based upon provisional application with a Ser. No. 60/917,951 which was filed on May 15, 2007.

FIELD OF THE INVENTION

The present invention relates to a system for dynamic injection of agents into remote applications. More particularly, the injected agents run within the process of the applications and have access to application data and resources without overhead caused by inter process communication or network connections.

The system is suitable to inject introspection agents used to capture data from monitored applications for usage by performance monitoring and failure diagnosis tools, but it may be used to deploy in process agents serving arbitrary purposes.

BACKGROUND OF THE INVENTION

The functionality of typical e-commerce applications is distributed over several tiers serving different purposes, like a business logic tier, a presentation tier or a database tier. Those tiers may be deployed to different servers or server clusters to enable scalability of the applications.

Large scaled organizations operate hundreds of such e-commerce applications, which may be distributed over thousands of different servers. The management and maintenance of such systems is a highly complex and difficult task, due to the large number of different server systems.

The configuration and management of an agent deployment system capable for such large scaled systems must be lightweight and less intrusive to the configuration of the applications the agents are deployed to. Alterations of application configuration required for agent deployment must be reduced to a minimum, and an easy and convenient way to manage and update the deployed agents must be provided.

Bytecode and virtual machine based systems like SUN MICROSYSTEMS' JAVA system or MICROSOFT's .NET system provide interfaces enabling the injection of agents into the process of bytecode interpreting virtual machines. Current agent deployment approaches for said virtual machine based systems adapt the configuration of the application by adding additional bytecode libraries to the bytecode libraries loaded by the application. Some approaches replace runtime libraries of the virtual machine hosting the application. Most approaches require to copy also configuration data, e.g. in form of XML-Config files locally to the server that hosts the application. Additionally, most current approaches require copying of multiple files locally to the server.

Consequently, an alternative system for agent deployment is required, which minimizes required configuration changes, and preferably only impacts the configuration of the virtual machine, leaving the configuration of the application unchanged. Additionally, the alternative system should not require copying bytecode libraries manually to servers hosting the application. The possibility to manage, update or upgrade the deployed agent from a remote, centralized management server should be provided.

SUMMARY OF THE INVENTION

A method for dynamically injecting an agent into an application may include the steps of connecting a bootstrap agent to the management server from a virtual machine, the management server being external to the virtual machine, initiating connections with the management server, requesting a handshake between the management server and the virtual machine by the bootstrap agent in response to the connections, determining matching in process agent binaries in response to the handshake and installing the in process agent binaries to the application of the management server.

The step of verifying that the version of the connected bootstrap agent may be supported by the management server, and the step of initiating connections includes the step of verifying that the version of the virtual machine may be supported by the management server.

The version of the bootstrap agent and the version of the virtual machine may be used to determine the matching in process agent binaries, and the format of the in process agent binaries may be determined.

The format of the in process agent binaries may be byte code, and the format of the in process agent binaries may be native code.

The byte code may be a single byte code in process agent binary and the native code may be a single native code in process agent binary.

BRIEF DESCRIPTION OF THE DRAWINGS

FIG. 1 conceptually describes the architecture of a preferable embodiment for dynamic injection of in-process agent binaries, showing a management server holding multiple in-process agent binaries and an application configured to load and start the bootstrap agent on initialization FIG. 2 depicts the application after the deployment of in-process agents (native or bytecode) by the bootstrap agent.

FIG. 3 conceptually depicts an agent deployment node which may be used to wrap binaries of an in-process agent and may be sent via network connection to a bootstrap agent running within the virtual machine of an application.

FIG. 4 shows the process of connecting the bootstrap agent to a management server, requesting in-process agent binaries, receiving the requested binaries and loading them to the virtual machine of the application.

FIG. 5 provides a flowchart of the process of an incoming bootstrap agent connection which is accepted by the management server, determining the matching in-process agent binary version according to the bootstrap agent version and the runtime environment of the application. Further it depicts the sending of said in-process agent binaries to the bootstrap agent.

FIG. 6a depicts the configuration of the bootstrap agent with a standalone application running on a virtual machine.

FIG. 6b shows the configuration of the bootstrap agent in a setup where an application server hosts multiple applications running on one virtual machine

DETAILED DESCRIPTION

The bytecode based software platforms like Sun Microsystems' Java or Microsoft's .NET framework provide interfaces to intercept the startup of virtual machines, to inject custom code into the virtual machines and to execute this code under control of the virtual machine.

The present invention is dedicated to a system and method for adaptive, dynamic, remote and automated injection of in-process agents into virtual machine based applications. The system is independent of the architecture of the application, which may be either a monolithic, stand alone application or an application running within the environment of a dedicated application server.

The present system may not require loading of additional bytecode libraries by the application. No modification or exchange of bytecode libraries of the application may be required, and no exchange of runtime libraries of the virtual machine may be needed. No access to application libraries or alteration of said libraries may be required, and also the configuration of the libraries used by the application, e.g. for SUN MICROSYSTEMS JAVA-based applications, the CLASSPATH of the application may not be affected.

Only deployment of a single additional file, the bootstrap agent library may be required. The bootstrap agent library file may reside at the host running the application or it may reside on a centralized network share to ease management of multiple applications and update of the bootstrap agent library.

The bootstrap agent loads the binaries of the in-process agent from a remote management server and injects the code into its hosting virtual machine. No local storage of the binaries and thus no write access to the local file system may be required.

Configuration of the bootstrap agent injection only consists in an additional startup directive for the virtual machine running the application, pointing to the location of the bootstrap agent library which is loaded and started during the initialization of the virtual machine, before bytecode interpretation is started. The startup directive also contains a parameter that specifies the network address of a management server which is used by the bootstrap agent to load the in-process agent.

The in-process agent is injected into the process of the application, enabling access to the applications data and resources by simple method or function calls without additional overhead caused by inter-process or network communication.

The bootstrap agent is loaded and started during initialization of the virtual machine of the application, and the parameter specifying the address of the management server is forwarded to the bootstrap agent.

The bootstrap agent establishes a network connection to the management server and requests the binaries representing the in-process agent. Said binaries may be in bytecode or native code format. Also a combination of both binary formats is supported by the present application. After the bootstrap agent received the requested binaries, it injects the received binaries into the process of the application, using interfaces provided by the virtual machine to load bytecode for execution or to load and execute native libraries.

The present invention takes advantage of these features and discloses a method to automatically inject binaries representing in-process agents into applications, without the requirement to change application specific configurations. The injected in-process agents are executed within the process of the application which enables access to application data and resources at the same level as original application code.

FIG. 1 shows an architectural block chart of an exemplary embodiment providing a method and system for dynamic and automated injection of in-process agents, containing an application 101 that loads and runs a bootstrap agent 104, and a management server 108. Application 101 and management server 108 are located at different hosts and the bootstrap agent 104 communicates with the management server 108 using a network connection.

A bootstrap agent 104 is loaded and started by the virtual machine 102 hosting the application 101, during initialization. Information about the physical location of the binary of the bootstrap agent 104 is provided to the virtual machine through startup parameters, conveyed either via command line parameters or startup scripts. Additionally, information about the network address of the management server 107 is provided to the bootstrap agent via startup parameters.

After the bootstrap agent 104 is loaded and started by the virtual machine, it initializes a network connection to the management server 108, requests a protocol handshake and transmission of the in-process agent binaries 106 from the management server 108.

The management server 108 accepts incoming bootstrap agent connections and forwards the connection to the agent deployment engine 109, which verifies if the version of the connected bootstrap agent in combination with the version of its hosting virtual machine are supported by the management server 108 and sends a handshake response accordingly. If the handshake was successful and a subsequent request for in-process agent transmission 106 is received, the deployment engine 109 uses data concerning the version of the bootstrap agent 104 and its hosting virtual machine 102 received during handshake to determine matching in-process agent binaries 110 for the requesting bootstrap agent 104. The matching in-process agent binaries 110 are loaded and analyzed by the deployment engine 109 to extract metadata required to install the in-process agent binaries to the application 101. In-process agent binaries 110 and extracted metadata are sent to the bootstrap agent 104, using the network connection established by said bootstrap agent 104.

The bootstrap agent 104 receives in-process agent binaries 110 and determines if the format of said in-process agent binaries is bytecode or native code, and loads received bytecode to the bytecode repository 103 of the virtual machine 102, and received native binaries to the native code execution module 105 of the virtual machine 102.

FIG. 2 depicts an application after the deployment and injection of a bytecode 201 and a native in-process agent 202. Present invention is capable to inject any combination of bytecode and native in-process agents, e.g. injecting a single bytecode in-process agent 201, a single native in-process agent 202 or both a bytecode and a native in-process agent into an application 101. Additionally, the invention enables incremental in-process agent injection, where a bootstrap agent 104 first injects a native agent 202, which in turn requests the deployment of a bytecode agent 201.

FIG. 3 shows the preferred embodiment of an agent deployment node 301. Agent deployment nodes 301 contain binary data 303 representing the functionality or parts of the functionality of a bytecode in-process agent 201, or a native in-process agent 202, which is injected into an application 101. Additionally, an agent deployment node contains metadata 302 describing said binary data. The metadata is required for the installation of the binary data 303 into the virtual machine 103 of the application 101. The metadata contains but is not limited to the name of the binary, type of the binary (bytecode or native) and the size of the binary data 303.

Agent deployment nodes 301 are used to transmit agent binaries 110 from the agent deployment engine 109 to the bootstrap agent 104.

FIG. 4 depicts the process of connecting the bootstrap agent 104 to the management server 108 and receiving in-process agent binaries 110 after a successful initial protocol handshake.

The bootstrap agent 104 is loaded and started by the virtual machine 102 on initialization, prior to the start of loading or processing bytecode of the application 101. At a first step, the bootstrap agent 104 establishes a network connection to the management server 108. The network address of the management server 108 is provided to the virtual machine via command line or script parameter and forwarded to the bootstrap agent.

After the network connection between the bootstrap agent 104 and the management server 108 is established, the bootstrap agent 104 sends a request for a protocol handshake 106 to the management server 108. The handshake request contains but is not limited to data about the version of the bootstrap agent, and information about the runtime environment of the application 101 containing but not limited to type, vendor and architecture of the virtual machine 102 hosting application 101 and bootstrap agent 104.

If the handshake request was performed successfully, the bootstrap agent 104 sends a request for transmission of the in-process agent binaries 106. In case of a failed handshake, the bootstrap agent reports an error event to its error log and closes the network connection to the management server. Execution of the application 101 continues without injected bytecode 201 or native 202 in-process agents.

The bootstrap agent 104 receives a response to the in-process agent deployment request indicating the availability of in-process agent binaries 110 matching the virtual machine configuration of the monitored application. If the response indicates that no matching in-process agent binaries 110 are available, the bootstrap agent 104 issues an error log before closing the network connection to the management server 108. Execution of the application 101 continues without injected bytecode 201 or native 202 in-process agents.

In case matching in-process agent binaries are available, the bootstrap agent 104 first receives all agent deployment nodes sent by the management server 108. After all agent deployment nodes 301 are received, the bootstrap agent 104 extracts binary data and the metadata required for the installation of the binary data from the received agent deployment nodes 301 and starts to install the received binaries to the virtual machine 102. The order of transmissions and installation takes interdependencies between different binaries into account. If all received binaries are installed successfully, the injected in-process bytecode 201 or native agent 202 can be initialized and executed. The network connection between the bootstrap agent 104 and the management server 108 remains open to enable communication between the injected native or bytecode in process agent 201 or 202 and the management server 108 using the bootstrap agent 104. Execution of the application 101 continues with injected bytecode 201 or native 202 in process agents.

In case of loading an in-process agent binary causes an error, the bootstrap agent closes the network connection to the management server 108 and reports an error to its log. Execution of the application 101 continues without injected bytecode 201 or native 202 in-process agents.

FIG. 5 illustrates the processing of a handshake request and a following request to deploy in-process agent binaries by the management server 108 using the agent deployment engine 109.

On receiving a handshake request from a bootstrap agent 104, the management server 108 first determines if version of the bootstrap agent 104 and type of the runtime environment of the application 101, as reported via the handshake request message, are supported by the management server 108. If the bootstrap agent 104 version or runtime environment of the application 101 is not supported by the management server 108, an error response is sent to the bootstrap agent 104, which in turn terminates the network connection to the management server.

After a successful handshake, the management server may receive a request for deployment of in-process agent binaries 106, which is forwarded to the agent deployment engine 108. The agent deployment engine 108 is using information received during the earlier handshake to determine the matching in-process agent binaries for the requesting bootstrap agent 104 and subsequently loads the respective binaries. If loading of the binaries fails, an error response is sent to the bootstrap agent, which in turn closes the network connection to the management server 108.

The loaded in-process agent binaries 110 are analyzed by the agent deployment engine 108 which first extracts metadata required to install the binaries at the application 101. Agent deployment nodes 301 are created and initialized with metadata required to install the loaded binaries in the virtual machine of the bootstrap agent 104 which is extracted from the loaded binaries. Additionally, the loaded binary data itself is stored in the created agent deployment nodes 301. The initialized agent deployment nodes 301 are sent to the bootstrap agent 104 using the network connection created by said bootstrap agent 104.

FIG. 6a and FIG. 6b show the configuration adaptations required to install the bootstrap agent 104, whereas FIG. 6a depicts the configuration of the bootstrap agent 104 with a standalone application 101 running on a virtual machine 102 and FIG. 6b shows the configuration of the bootstrap agent 104 in a setup where an application server 604 hosts multiple applications 101 running on one virtual machine.

FIGS. 6a and 6b show the configuration adaptations required to install the bootstrap agent. Installing the bootstrap agent does not affect the configuration data of the application 601, which contains application specific configuration that changes from application to application. The bootstrap agent configuration 603 is located within the configuration of the virtual machine 602. This design allows reusing virtual machine configurations 602 which contain a bootstrap agent configuration 603 for different applications, which simplifies installation of the bootstrap agent. The bootstrap agent configuration 603 may contain, but is not limited to the location of the bootstrap agent binaries or an agent ID.

Typically, application configuration data contains data which is specific to an application, like the libraries used by the application, relations between different components of the application etc. Application configuration data tends to be large and complex. Structure and content of this configuration data depend on the type of the application. Application configuration data may be packaged together with the application binaries, like e.g. in a J2EE WAR or EAR file.

Application server configuration data contains defines the resources which the application server provides to the applications it hosts, like data base connection pools, component pools etc. This configuration data typically consists in multiple, complex structured XML files. Structure and content of those files depend on version and vendor of the application server.

The invention claimed is:

1. A method for dynamically injecting an in-process agent into an application which is hosted by a virtual machine, comprising the steps of:

at the virtual machine hosting the application, loading and starting a bootstrap agent during initialization of the virtual machine and before code of the application is loaded or processed, without modifying configuration data of the application;

at the bootstrap agent, initiating a network connection to a management server, the management server being external to the virtual machine;

using the bootstrap agent to request transmission of in-process agent binaries from the management server;
at the management server, verifying that a version of the bootstrap agent and a version of the virtual machine are supported by the management server;
if the version of the bootstrap agent and the version of the virtual machine are supported by the management server, then:
using data concerning the version of the bootstrap agent and the version of the virtual machine to determine matching in process agent binaries for the bootstrap agent, wherein the matching in process agent binaries represent the in process agent;
sending the matching in process agent binaries to the bootstrap agent using the network connection;
at the bootstrap agent:
receiving the in process agent binaries;
loading the received in process agent binaries to the virtual machine without modifying configuration data of the application;
initializing the in process agent binaries; and
executing the in process agent binaries.

2. The method of claim 1, further comprising, at the bootstrap agent, determining a format of the in process agent binaries and loading the in process agent binaries to the virtual machine based on the determined format.

3. The method of claim 2, wherein the format of the in process agent binaries is byte code, and wherein loading the received in process agent binaries comprises loading the received in process agent binaries to a bytecode repository of the virtual machine based on the determination that the format of the in process agent binaries is byte code.

4. The method of claim 2:
wherein the format of the in process agent binaries is native code, and wherein loading the received in process agent binaries comprises loading the received in process agent binaries to the native code execution module of the virtual machine based on the determination that the format of the in process agent binaries is native code; and
wherein the method further comprises:
at the in process agent loaded to the native code execution module, receiving bytecode in-process agent binaries from the management server and loading the received bytecode in process agent binaries to the bytecode repository of the virtual machine.

5. The method of claim 3, wherein the format of the in process agent binaries is native code, and wherein loading the received in process agent binaries comprises loading the received in process agent binaries to the native code execution module of the virtual machine based on the determination that the format of the in process agent binaries is native code.

6. The method of claim 3, wherein the byte code is a single byte code in process agent binary.

7. The method of claim 5, wherein the native code is a single native code in process agent binary.

8. The method of claim 1, wherein bootstrap agent configuration information is located within a configuration of the virtual machine.

9. The method of claim 1:
further comprising installing the bootstrap agent at the virtual machine;
wherein the virtual machine has a virtual machine configuration, wherein the virtual machine configuration includes a bootstrap agent configuration for the bootstrap agent;
wherein the virtual machine hosts the application, wherein the virtual machine includes the application configuration data, and wherein the application configuration data is specific to the application, and wherein installing the bootstrap agent does not affect the application configuration data.

10. The method of claim 1:
further comprising installing the bootstrap agent at the virtual machine;
wherein the virtual machine has a virtual machine configuration, wherein the virtual machine configuration includes a bootstrap agent configuration for the bootstrap agent;
wherein the virtual machine hosts an application server, wherein the application server hosts multiple applications including the application, wherein each of the multiple applications has corresponding application configuration data specific to the application, and
wherein the method further comprises reusing the virtual machine configuration for the multiple applications, and wherein installing the bootstrap agent does not affect the application configuration data.

11. The method of claim 1, wherein loading the received in process agent binaries comprises loading the received in process agent binaries without modifying configuration data of the application.

12. The method of claim 1, wherein loading the received in process agent binaries comprises loading the received in process agent binaries without modifying bytecode libraries of the application.

13. The method of claim 1, wherein loading the received in process agent binaries comprises loading the received in process agent binaries to the virtual machine before loading bytecode of the application.

14. The method of claim 1, wherein the in process agent comprises means for capturing data from monitored applications for use by at least one of performance monitoring tools and failure diagnostic tools.

15. The method of claim 1, further comprising:
keeping the network connection open between the bootstrap agent and the management server to enable communication between the in process agent and the management server.

16. The method of claim 1, further comprising:
transmitting an agent deployment node containing binary data representing parts of the functionality of the in process agent.

17. A system for dynamically injecting an agent into an application which is hosted by a virtual machine, comprising:
a host running the application,
a virtual machine comprising means for loading and starting a bootstrap agent during initialization of the virtual machine and before code of the application is loaded or processed, without modifying configuration data of the application,
a bootstrap agent comprising:
means for initiating a network connection with a management server, the management server being external to the virtual machine; and
means for requesting transmission of in-process agent binaries from the management server;
wherein the management server comprises:
means for verifying that a version of the bootstrap agent and a version of the virtual machine are supported by the management server;
means, responsive to a determination that the version of the bootstrap agent and the version of the virtual machine are supported by the management server, comprising:

means for using data concerning the version of the bootstrap agent and the version of the virtual machine to determine matching in process agent binaries for the bootstrap agent, wherein the matching in process agent binaries represent the in process agent;

means for sending the matching in process agent binaries to the bootstrap agent using the network connection; and wherein the bootstrap agent further comprises:
means for receiving the in process agent binaries;
means for loading the received in process agent binaries to the virtual machine without modifying configuration data of the application;
means for initializing the in process agent binaries; and
means for executing the in process agent binaries.

18. The system of claim 17, wherein the bootstrap agent further comprises means for determining a format of the in process agent binaries and means for loading the in process agent binaries to the virtual machine based on the determined format.

19. The system of claim 18, wherein the format of the in process agent binaries is byte code, and wherein the means for loading the received in process agent binaries comprises means for loading the received in process agent binaries to a bytecode repository of the virtual machine based on the determination that the format of the in process agent binaries is byte code.

20. The system of claim 18:
wherein the format of the in process agent binaries is native code, and wherein loading the received in process agent binaries comprises loading the received in process agent binaries to the native code execution module of the virtual machine based on the determination that the format of the in process agent binaries is native code; and wherein the system further comprises:
means, at the in process agent loaded to the native code execution module, for receiving bytecode in-process agent binaries from the management server and loading the received bytecode in process agent binaries to the bytecode repository of the virtual machine.

21. The system of claim 19, wherein the format of the in process agent binaries is native code, and wherein loading the received in process agent binaries comprises loading the received in process agent binaries to the native code execution module of the virtual machine based on the determination that the format of the in process agent binaries is native code.

22. The system of claim 19, wherein the byte code is a single byte code in process agent binary.

23. The system of claim 21, wherein the native code is a single native code in process agent binary.

24. The system of claim 17, wherein bootstrap agent configuration information is located within a configuration of the virtual machine.

25. The system of claim 17:
further comprising means for installing the bootstrap agent at the virtual machine;
wherein the virtual machine has a virtual machine configuration, wherein the virtual machine configuration includes a bootstrap agent configuration for the bootstrap agent;
wherein the virtual machine hosts the application, wherein the virtual machine includes the application configuration data, and wherein the application configuration data is specific to the application, and wherein installing the bootstrap agent does not affect the application configuration data.

26. The system of claim 17:
further comprising means for installing the bootstrap agent at the virtual machine;
wherein the virtual machine has a virtual machine configuration, wherein the virtual machine configuration includes a bootstrap agent configuration for the bootstrap agent;
wherein the virtual machine hosts an application server, wherein the application server hosts multiple applications including the application, wherein each of the multiple applications has corresponding application configuration data specific to the application, and
wherein the system further comprises means for reusing the virtual machine configuration for the multiple applications, and wherein installing the bootstrap agent does not affect the application configuration data.

27. The system of claim 17, wherein the means for loading the received in process agent binaries comprises means for loading the received in process agent binaries without modifying configuration data of the application.

28. The system of claim 17, wherein the means for loading the received in process agent binaries comprises means for loading the received in process agent binaries without modifying bytecode libraries of the application.

29. The system of claim 17, wherein the means for loading the received in process agent binaries comprises means for loading the received in process agent binaries to the virtual machine before loading bytecode of the application.

30. The system of claim 17, wherein the in process agent comprises means for capturing data from monitored applications for use by at least one of performance monitoring tools and failure diagnostic tools.

31. The system of claim 17, further comprising:
means for keeping the network connection open between the bootstrap agent and the management server to enable communication between the in process agent and the management server.

32. The system of claim 17, further comprising:
means for transmitting an agent deployment node containing binary data representing parts of the functionality of the in process agent.

* * * * *